US00RE39408E

(19) United States
(12) Reissued Patent
Wang

(10) Patent Number: US RE39,408 E
(45) Date of Reissued Patent: Nov. 28, 2006

(54) SELF-INFLATING MATTRESS

(75) Inventor: Kenneth Wang, Taipei (TW)

(73) Assignee: Team Worldwide Corporation, Taipei (TW)

(21) Appl. No.: 10/420,163

(22) Filed: Apr. 22, 2003

Related U.S. Patent Documents

Reissue of:
(64) Patent No.: 6,219,868
Issued: Apr. 24, 2001
Appl. No.: 09/593,214
Filed: Jun. 14, 2000

(51) Int. Cl.
*A47G 9/06* (2006.01)

(52) U.S. Cl. ..... 5/709; 5/420; 5/656; 5/708
(58) Field of Classification Search ..... 5/420, 5/708–710, 713, 656
See application file for complete search history.

(56) References Cited

U.S. PATENT DOCUMENTS 5,303,435 A * 4/1994 Haar et al. ..... 5/709
5,564,143 A * 10/1996 Pekar et al. ..... 5/708
5,630,237 A * 5/1997 Ku ..... 5/420
5,632,055 A * 5/1997 Graf ..... 5/706
5,898,963 A * 5/1999 Larson ..... 5/644
6,038,722 A * 3/2000 Giori et al. ..... 5/709

* cited by examiner

*Primary Examiner*—Michael Trettel
(74) *Attorney, Agent, or Firm*—Quintero Law Office

(57) ABSTRACT

A self-inflating mattress which comprises a first chamber, a second chamber, a foam and a check valve, wherein, the foam is disposed inside the first chamber. The check valve is provided between the first chamber and the second chamber, and air is allowed to flow only from the first chamber to the second chamber.

13 Claims, 9 Drawing Sheets

SELF-INFLATING MATTRESS

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates in general to a self-inflating mattress to be inflated without using any additional tool.

2. Description of the Related Art

Referring to FIG. 1, a conventional self-inflating mattress having a cover is shown. The inside of the cover is divided into two isolated chambers 11, 12, wherein the chamber 11 has a foam 13 provided inside while the chamber 12 is empty. When storing the mattress, the user squeezes air out of the foam 13 and rolls up the mattress. When using the mattress, the user spreads out the mattress roll so that the foam 13 automatically expands by absorbing outside air via the inflation valve 14. Then, the user fills the chamber 12 with air through the inflation valve 15 by an air pump (not shown).

It is understood that the user needs to use a tool (air pump) to pump the chamber (pillow) 12 of the mattress. In other words, the user needs to always carry an air pump besides the mattress to places such as the beach, which is neither economical nor convenient for the user.

SUMMARY OF THE INVENTION

An object of the present invention is to modify the conventional self-inflating mattress so that inflating the mattress does not require any tool.

The self-inflating mattress of the present invention includes a first chamber, a second chamber, a first valve, a second valve, a foam, and a check valve. The foam is received inside the first chamber. The check valve is provided between the first chamber and the second chamber so that only air from the first chamber is allowed to flow to the second chamber. The first valve is attached to the first chamber for inflating and deflating the first chamber while the second valve is attached to the second chamber for deflating the second chamber.

To inflate the mattress, the user spreads out the mattress so that the foam inside the first chamber automatically expands by absorbing outside air via the first valve. Then, the user closes the first and the second valves and rolls up the first chamber, thereby pushing air in the foam into the second chamber via the check valve. Furthermore, the user spreads out the first chamber and re-opens the first valve so that the foam automatically expands again by absorbing outside air via the first valve. It is therefore understood that the inflation of the mattress according to the present invention does not require any tool.

BRIEF DESCRIPTION OF THE DRAWINGS

The present invention can be more fully understood by the detailed description and examples described hereinafter with references made to the accompanying drawings, wherein.

DETAILED DESCRIPTION OF THE PREFERRED EMBODIMENT

Figure 1:
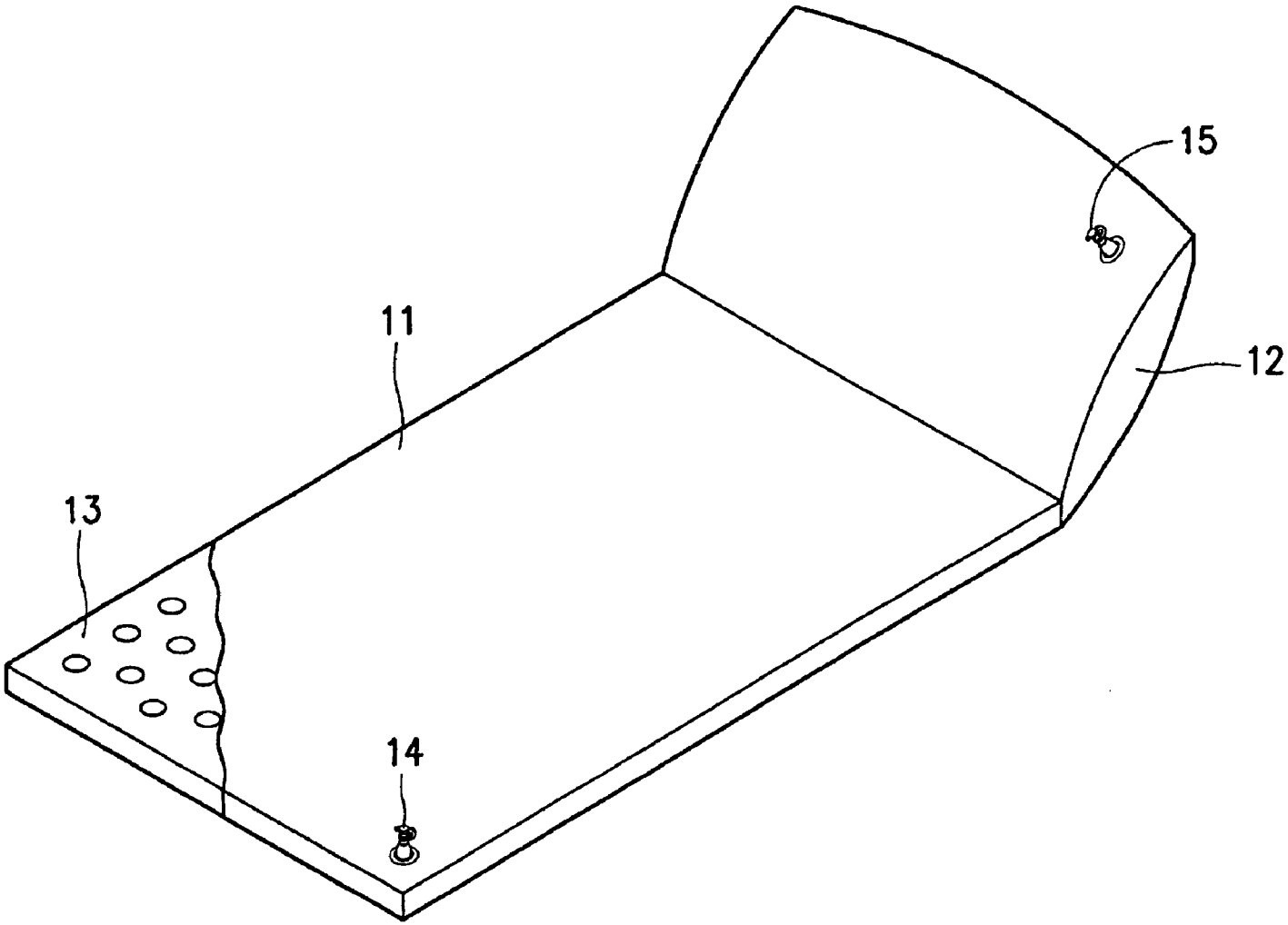
Fig. 1 ( PRIOR ART )
FIG. 1 depicts a conventional self-inflating mattress.
Figure 2:
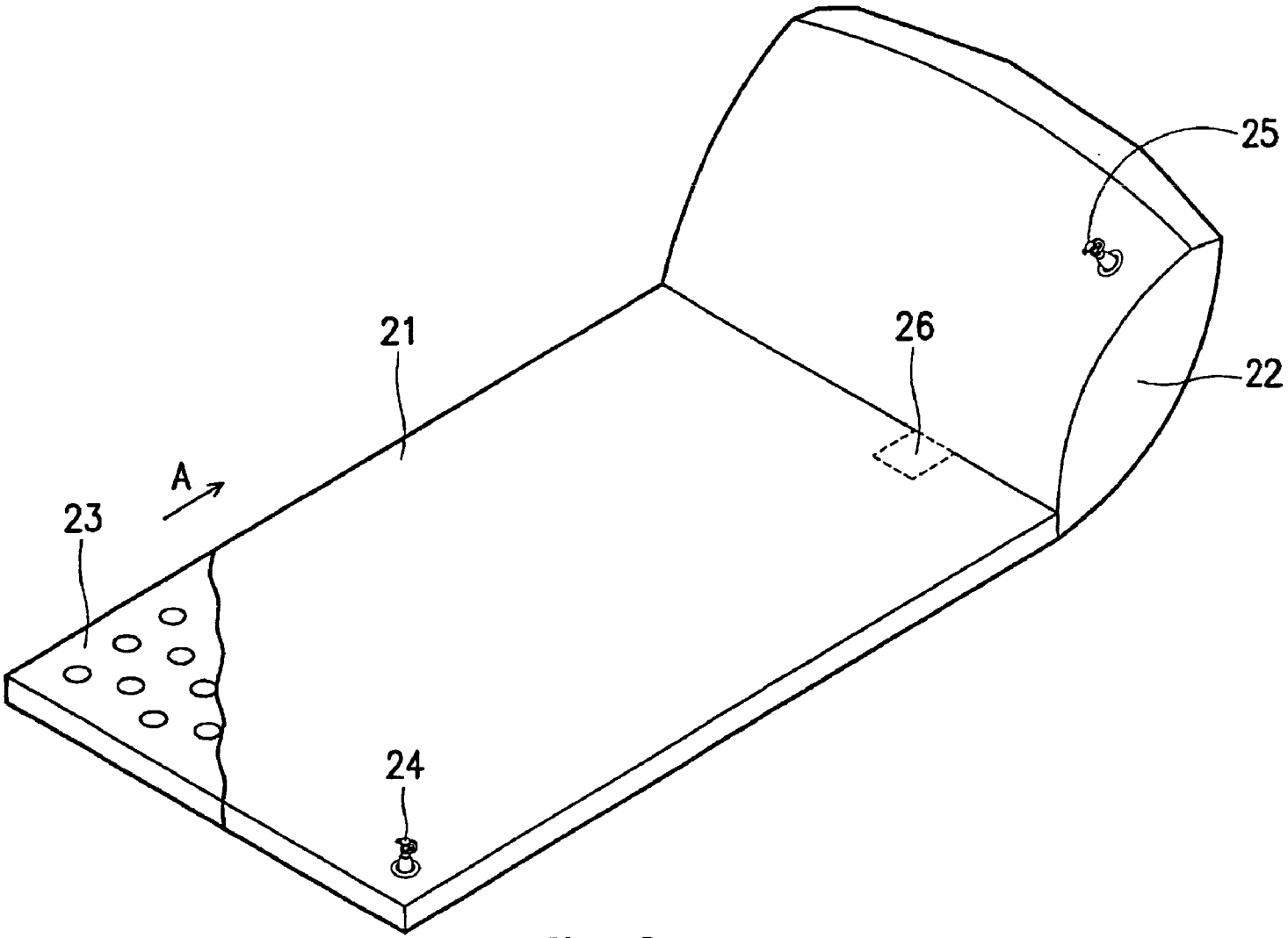
FIG. 2 depicts a self-inflating mattress in accordance with the embodiment one of the present invention.

Embodiment one:

Referring to FIG. 2, a self-inflating mattress of the present invention includes a flexible cover. Wherein, the inner space of the cover is divided into a first chamber 21 and a second chamber 22. Two valves 24, 25 are provided on the cover for inflating and deflating the chambers 21, 22 respectively. The first chamber 21 has a foam 23 disposed inside while the second chamber 22 is empty. Furthermore, a check valve 26 is buried in the foam 23 of the first chamber 21 abutting the second chamber 22 to allow air to communicate between the two chambers 21, 22.

When storing the mattress, a user first opens the valves 24, 25, squeezes air out of the chambers 21, 22, and rolls up the mattress. The check valve 26 is protected by the surrounding foam 23 so that bending of the check valve 26 would not occur when the mattress is rolled, which prevents the check valve 26 from being damaged. When inflating the mattress, the user spreads out the mattress roll, which allows the foam 23 to expand automatically by absorbing outside air via the valve 24. Then, the user closes both of the valves 24, 25 and rolls up the first chamber 21 in direction A, thereby forcing the air inside the foam into the second chamber 22 via the check valve 26. Then, the user spreads out the first chamber 21 and opens the valve 24 again so that the foam 23 automatically expands again by absorbing outside air via the valve 24. Thereafter, the user closes the valve 24. It is therefore understood that inflation of the mattress according to the present invention does not require any tool.

Figure 3A:
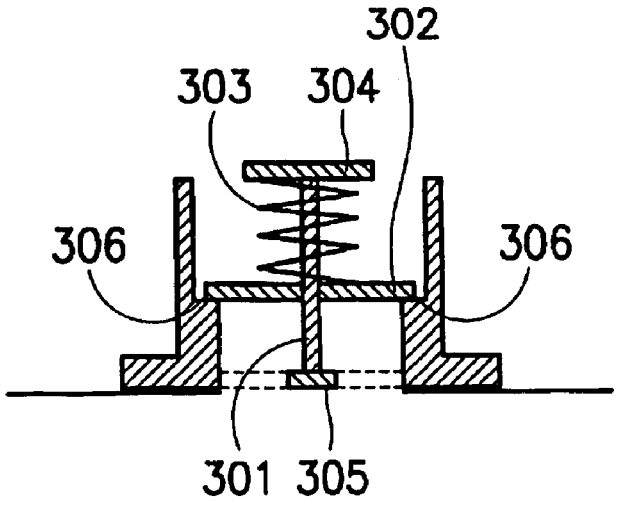
FIG. 3A is a sectional view of a check valve in accordance with a first example as disclosed in the embodiment one of the present invention.
Figure 3B:
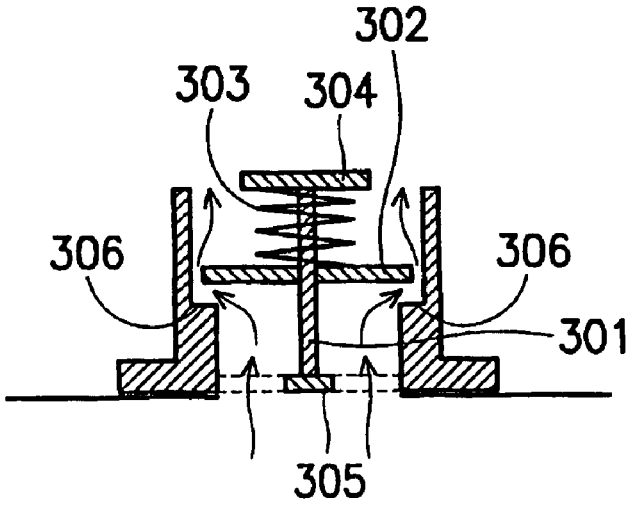
FIG. 3B shows an operating principle of the check valve shown in FIG. 3A.

FIG. 3A depicts a check valve in accordance with a first example of this embodiment, wherein the check valve includes an inner flange 306, a rod 301, a diaphragm 302, and a spring 303. In particular, an end 304 of the rod 301 is disk-shaped while the other end 305 is anchored to the check valve. The diaphragm 302 is movably installed on and guided by the rod 301 with the spring 303 pushing the diaphragm 302 against the disk-shaped end 304 of the rod 301. Normally, the diaphragm 302 is rested on the inner flange 306 of the check valve. When being operated, the diaphragm 302 is pushed away from the inner flange 306 by air pressure, which allows the air to flow through the check valve in a single direction as shown in FIG. 3B.

Figure 4A:
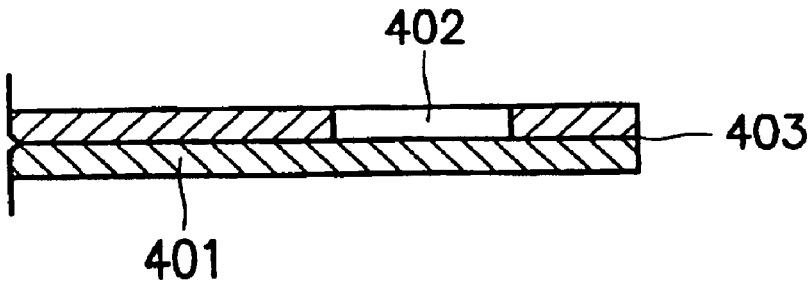
FIG. 4A is a sectional view of a check valve in accordance with a second example as disclosed in the embodiment one of the present invention.
Figure 4B:
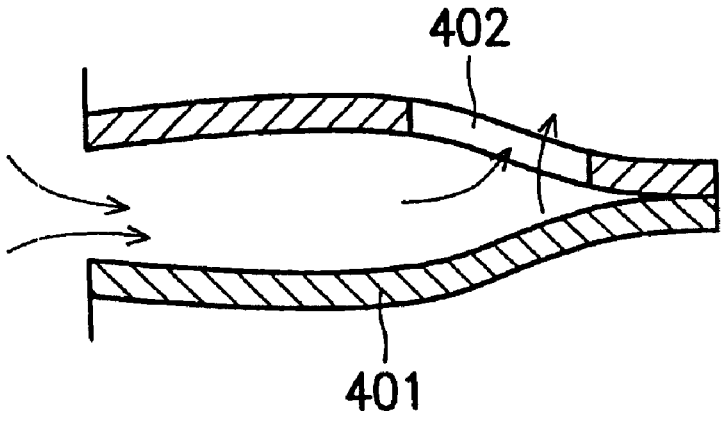
FIG. 4B shows an operating principle of the check valve shown in FIG. 4A.

FIG. 4A depicts a check valve in accordance with a second example of this embodiment, wherein the check valve includes a flexible sleeve 401 made of, for example, plastic. In particular, an end 403 of the sleeve 401 is permanently sealed off by heat-sealing while a hole 402 is provided on the sleeve 401. The flexible sleeve 401 normally is flat but expands in operation, allowing the air to flow out from the hole 402 as shown in FIG. 4B.

Figure 5A:
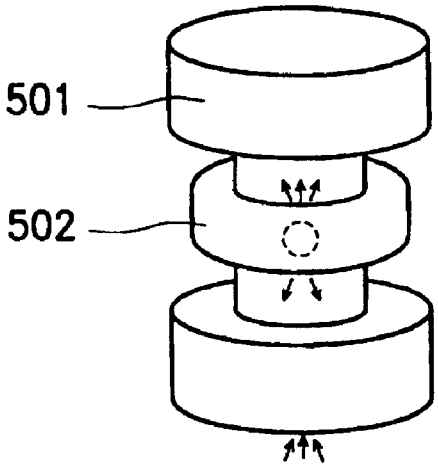
FIG. 5A is a perspective diagram of a check valve in accordance with a third example as disclosed in the embodiment one of the present invention.
Figure 5B:
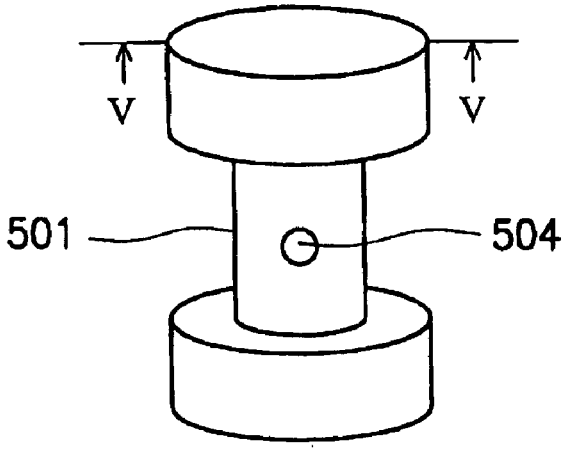
FIG. 5B is a perspective diagram of the body of the check valve shown in FIG. 5A.
Figure 5C:
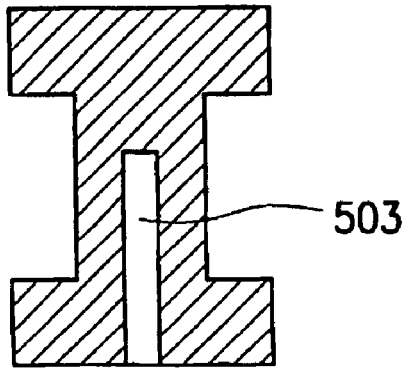
FIG. 5C is a sectional view of the body of the check valve along the line V—V as shown in FIG. 5B.

FIG. 5A depicts a check valve in accordance with a third example of this embodiment, wherein the check valve includes a stiff dumbbell-shaped body 501 and a resilient ring 502 wrapped round the body 501. Further referring to FIGS. 5B and 5C, the valve body 501 has a longitudinal passage 503 formed inside and a lateral hole 504 connected to the passage 503. Thus, the resilient ring 502 wrapped around the body 501 can only allow air to flow out from the hole 504.

Figure 6A:
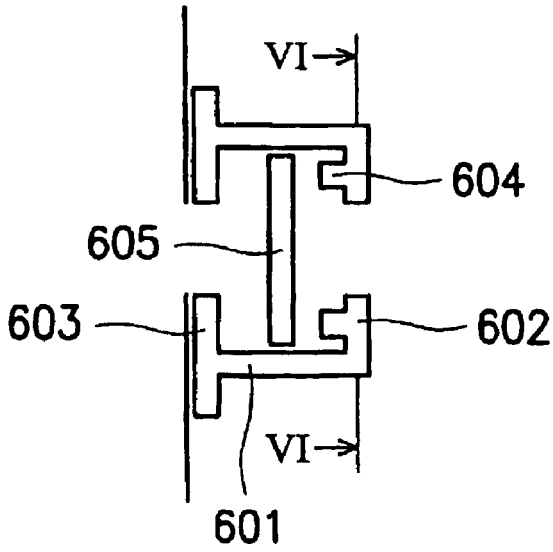
FIG. 6A depicts a check valve in accordance with a fourth example as disclosed in the embodiment one of the present invention.
Figure 6B:
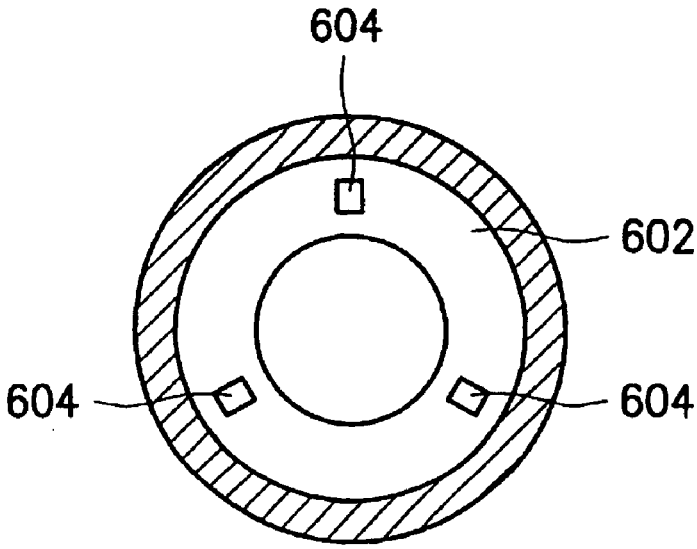
FIG. 6B is a sectional view of the check valve along the line VI—VI as shown in FIG. 6A.

Referring to FIGS. 6A and 6B, a check valve in accordance with a fourth example of this embodiment includes a tube 601 and a diaphragm 605. The tube 601 has a pair of annular lips 602, 603 separately formed at opposite ends of the tube 601 to confine the diaphragm 605 inside the tube 601. Furthermore, a plurality of protrusions 604 are formed, e.g. equidistantly, on the inner surface of the annular lip 602. In operation, the diaphragm 605 is pushed against the protrusions 604 by air pressure, which causes a plurality of gaps to be temporarily formed between the diaphragm 605 and the lip 602 of the check valve that only allows air to flow through the check valve in a direction opposite to the arrow shown in FIG. 6A. In another word, the airflow cannot flow through the check valve in the direction of the arrow when the diaphragm 605 is pushed against the lip 603 by air pressure.

It is understood that a variety of check valves can be incorporated into the present invention to control and regulate an unidirectional airflow from the first chamber 21 to the second chamber 22.

Figure 7:
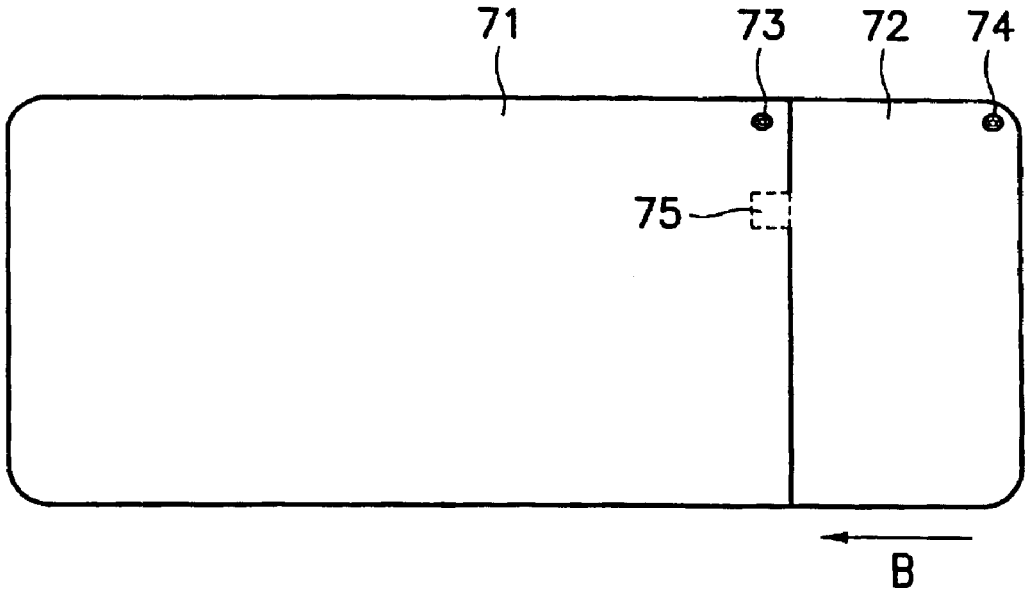
FIG. 7 depicts a self-inflating mattress in accordance with the embodiment two of the present invention.

Embodiment two:

Referring to FIG. 7, a self-inflating mattress of the present invention includes a flexible cover. Wherein, the inner space of the cover is divided into a first chamber 71 and a second chamber 72. Two valves 73, 74 are provided on the cover for inflating and deflating the chambers 71, 72 respectively. Both of the chambers 71, 72 have foams disposed inside. Furthermore, a check valve 75 is buried in the foam of the first chamber 71 abutting the second chamber 72 to allow air to communicate between the two chambers 71, 72.

When inflating the mattress, a user opens each of the valves 73, 74 so that the foams in the chambers 71, 72 are allowed to automatically expand by absorbing outside air. Then, the user closes both of the valves 73, 74 and rolls up the second chamber 72 in direction B, thereby forcing the air inside the foam of the second chamber 72 into the first chamber 71 via the check valve 75. Then, the user spreads out the second chamber 72 and opens the valve 74 again so that the foam in the second chamber 72 automatically expands again by absorbing outside air. Thereafter, the user closes the valve 74. In this way, the first chamber 71 can be filled with air sufficiently enough that the user can enjoy lying on the mattress comfortably. It is also understood that the inflation of the mattress according to the present invention does not require any tool.

Figure 8:
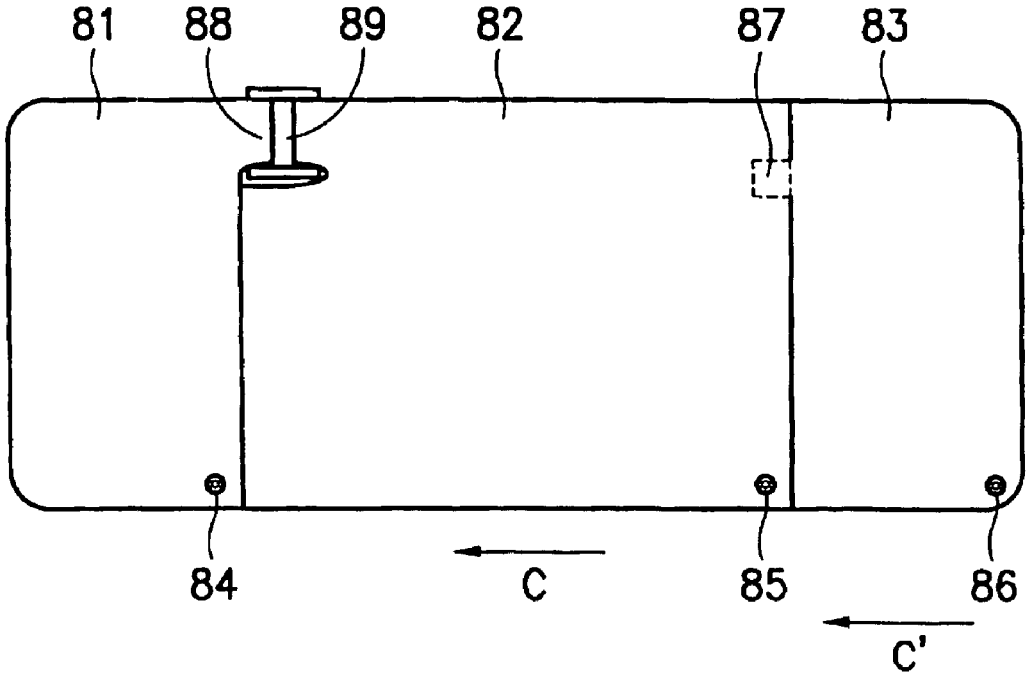
FIG. 8 depicts a self-inflating mattress in accordance with the embodiment three of the present invention.

Embodiment three:

Referring to FIG. 8, a self-inflating mattress of the present invention includes a flexible cover. Wherein, the inner space of the cover is divided into a first chamber 81, a second chamber 82 and a third chamber 83. Three valves 84, 85, 86 are provided on the cover for inflating and deflating the chambers 81, 82, 83 respectively. The second and the third chambers 82, 83 have foams disposed inside while the first chamber 81 is empty. Furthermore, a passage 88 is provided between the first and the second chambers 81, 82, wherein a closing device 89 is provided for controlling the closing and opening of the passage 88. Furthermore, a check valve 87 is buried in the foam of the second chamber 82 abutting the third chamber 83 to allow air to communicate between the second and the third chambers 82, 83.

When inflating the mattress, a user opens the valves 85 and closes the valve 84 so that the foam in the second chambers 82 is allowed to automatically expand by absorbing outside air via the valve 85. Then, the user closes the valve 85 and rolls up the second chamber 82 in direction C, thereby forcing the air inside the foam of the second chamber 82 into the first chamber 81 via the passage 88. Thus, the first chamber (i.e. the pillow) is filled with air. Then, the user closes the passage 88 by shutting the closing device 89. Then, the user spreads out the second chamber 82 again and opens the valves 85, 86 so that the foams in the second and third chambers 82, 83 automatically expand by absorbing outside air. Next, the user closes the valves 85, 86 and rolls up the third chamber 83 in direction C, thereby forcing the air inside the foam of the third chamber 83 into the second chamber 82 via the check valve 87. Then, the user opens the valve 86 only so that the foam in the third chamber 83 is allowed to automatically expand by absorbing outside air. Thereafter, the user closes the valve 86. In this way, the second chamber 82 can be filled with air sufficiently enough that the user can enjoy lying on the mattress comfortably. It is also understood that the inflation of the mattress according to the present invention does not require any tool.

Figure 9A:
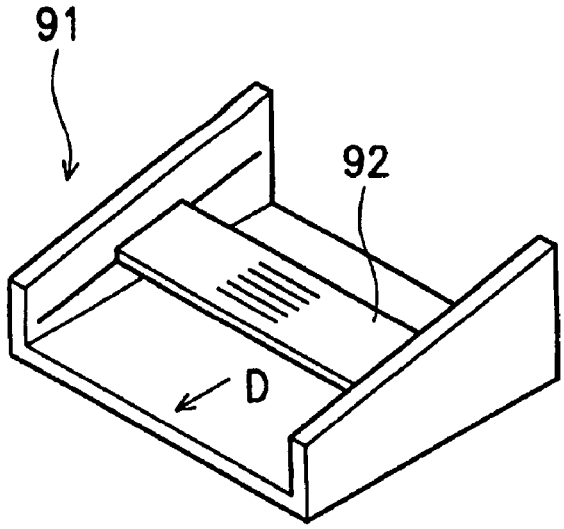
FIG. 9A depicts a closing device in accordance with a first example as disclosed in the embodiment three of the present invention.
Figure 9B:
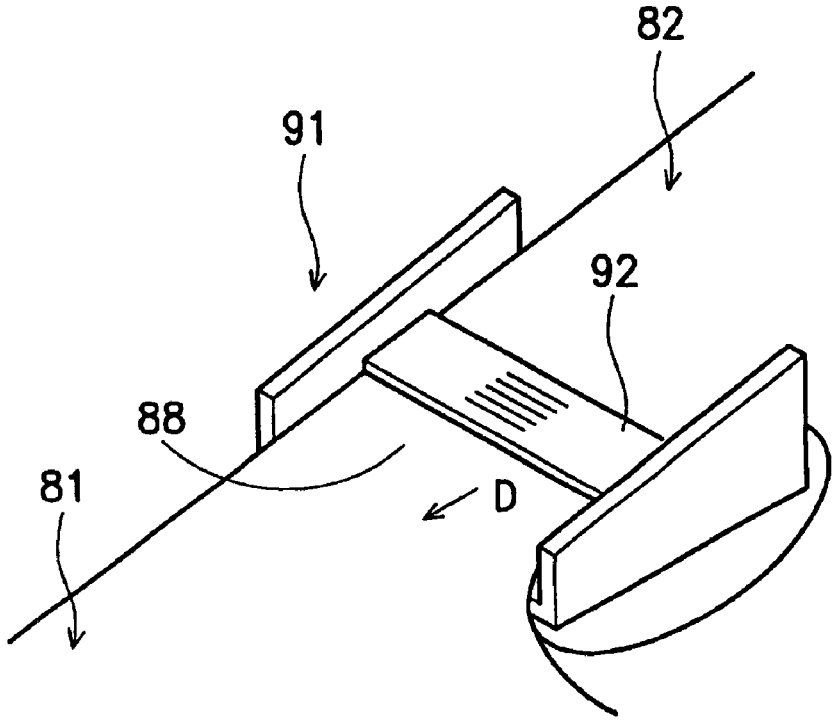
FIG. 9B depicts the closing device shown in FIG. 9A mounted on the mattress in accordance with the embodiment three of the present invention.

Now referring to FIGS. 9A and 9B, the closing device according to a first example of this embodiment is a clip as shown. When the user pushes the slider 92 of the clip 91 in direction D, the passage 88 of the mattress between the first and second chambers 81, 82 is closed.

Figure 10:
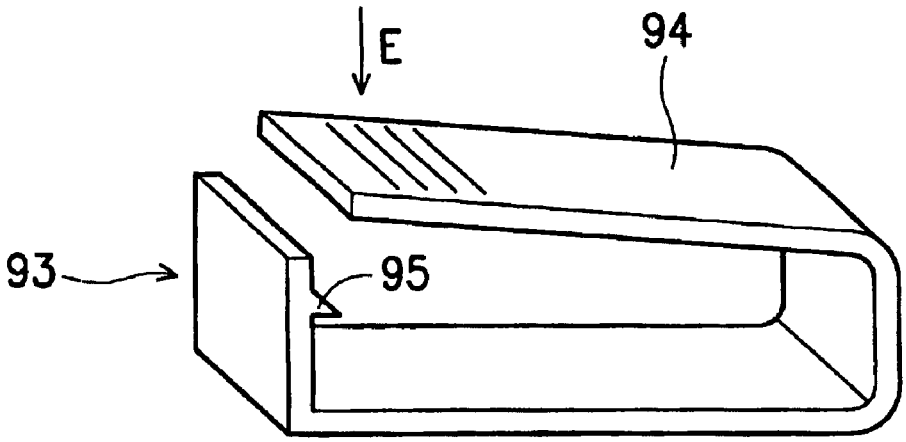
FIG. 10 depicts a closing device in accordance with a second example as disclosed in the embodiment three of the present invention.

Referring to FIG. 10, the closing device according to a second example of this embodiment is also a clip. When the user pushes down the cantilever arm 94 of the clip 93 in direction E such that the cantilever arm 94 is engaged tightly with the protrusion 95 and that the passage of the mattress between the first and second chambers is closed.

Figure 11:
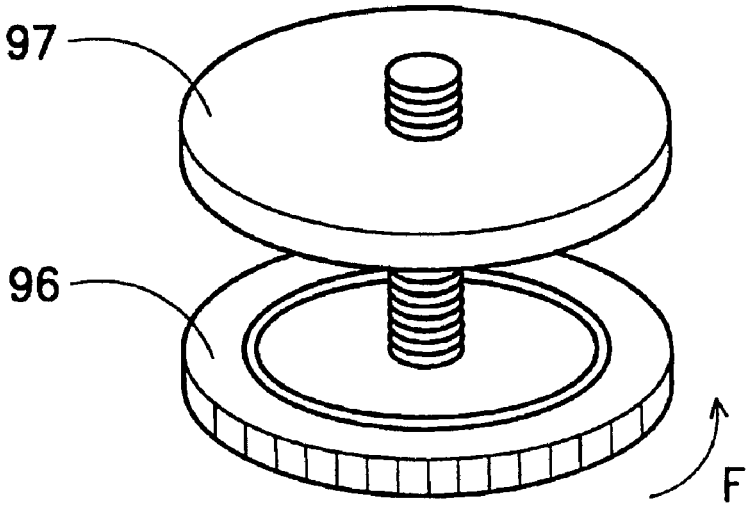
FIG. 11 depicts a closing device in accordance with a third example as disclosed in the embodiment three of the present invention.

Referring to FIG. 11, the closing device according to a third example of this embodiment is a bolt as shown. The bolt has an enlarged head 96 and a matching nut 97. In operation, the user twists the head 96 of the bolt in direction F so that the head 96 and the nut 97 can get close enough to close the passage of the mattress between the first and second chambers.

While the invention has been described by way of example and in terms of the preferred embodiment, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A self-inflating mattress including:

a first chamber;

a second chamber;

a first foam received in the first chamber; and a check valve buried in the first foam to communicate the first chamber and the second chamber, only allowing air inside the first foam to flow from the first chamber to the second chamber when the first chamber is compressed.

2. A self-inflating mattress as claimed in claim 1, wherein the check valve comprises an inner flange, a rod, a diaphragm and a spring, wherein the spring surrounds the rod and biases the diaphragm against the flange, and wherein when sufficient air pressure is present, the diaphragm is pushed away from the flange thereby allowing air to flow through the check valve.

3. A self-inflating mattress as claimed in claim 1, wherein the check valve comprises a dumbbell-shaped body including an internal longitudinal passage open at a first longitudinal end of the body and a lateral hole opening a second end of the longitudinal passage, and a resilient ring wrapped around the body covering the lateral hole, whereby air can only flow out from the lateral hole.

4. A self-inflating mattress as claimed in claim 1, wherein the check valve comprises a tube and a diaphragm, the tube having (i) a pair of annular lips formed at opposite ends of the tube to confine the diaphragm inside the tube and (ii) a plurality of protrusions formed on an inner surface of one of the annular lips, whereby air can flow through the check valve when the diaphragm is pushed against the protrusions, but is precluded from flowing through the check valve when the diaphragm is pushed against the other one of the annular lips.

5. A self-inflating mattress including:

a first chamber;

a second chamber;

a first foam received in the first chamber; and a second foam received in the second chamber;

a check valve provided between the first chamber and the second chamber, only allowing air inside the first foam to flow from the first chamber to the second chamber when the first chamber is compressed.

6. A self-inflating mattress as claimed in claim 5, further including a third chamber, a passage communicating the first and third chambers, and a closing device for opening and closing the [passing] *passage*.

7. A self-inflating mattress as claimed in claim 6, further including a first valve attached to the first chamber for inflating and deflating the first chamber, a second valve attached to the second chamber for inflating and deflating the second chamber, and a third valve attached to the third chamber for inflating and deflating the third chamber.

8. A method of inflating a mattress, comprising the steps of:

opening a first valve to a first chamber including foam and permitting the foam to expand;

closing the first valve and a second valve to a second chamber;

forcing air from the first chamber to the second chamber through a check valve buried in the foam of the first chamber;

reopening the first valve to permit the foam to expand; and closing the first valve.

9. A method of inflating a mattress, comprising the steps of:

opening a first valve to a first chamber including foam and opening a second valve to a second chamber including foam and permitting the foam in both chambers to automatically expand;

closing the first valve and the second valve;

forcing air from the second chamber into the first chamber through a check valve buried in the foam of the first chamber;

reopening the second valve to permit the foam in the second chamber to expand; and closing the second valve.

10. A method of inflating a mattress having (i) first, second and third chambers and respective first, second and third valves, the second and third chambers having foam disposed therein, (ii) a passage, closeable via a closing device, connecting between the first and second chambers, and (iii) a check valve buried in the foam of the second chamber, the check valve allowing air to communicate between the second and third chambers, the method comprising the steps of:

opening the second valve and closing the first valve;

allowing the foam in the second chamber to expand;

closing the second valve;

forcing air from the second chamber into the first chamber via the passage;

closing the closing device;

opening the second and third valves and allowing the foam in those chambers to expand;

closing the second and third valves;

forcing air from the third chamber into the second chamber via the check valve;

opening the third valve and allowing the foam therein to expand; and closing the third valve.

11. A method of inflating a mattress, comprising the steps of:

providing a mattress with a first chamber and a second chamber, the first chamber having foam disposed therein; and forcing air from the first chamber into the second chamber through a check valve buried in the foam, the check valve only allowing air inside the first chamber to flow from the first chamber to the second chamber when the first chamber is compressed.

*12. A method of inflating a mattress, comprising the steps of:*

*opening a first valve to a first chamber including foam and permitting the foam to expand;*

*closing the first valve and a second valve to a second chamber;*

*forcing air from the first chamber to the second chamber through a passage provided between the first chamber and the second chamber;*

*closing a closing device to prevent air from the second chamber from passing to the first chamber through the passage;*

*reopening the first valve to permit the foam to expand; and*

*closing the first valve.*

*13. A method of inflating a mattress having (i) first, second and third chambers and respective first, second and third valves, the second and third chambers having foam disposed therein, (ii) a passage, closeable via a closing device, connecting between the first and second chambers, and (iii) a check valve provided between the second chamber and the third chamber, allowing air to communicate between the second and third chambers, the method comprising the steps of:*

*opening the second valve and closing the first valve;*

*allowing the foam in the second chamber to expand;*

*closing the second valve;*

*forcing air from the second chamber into the first chamber via the passage;*

*closing the closing device;*

*opening the second and third valves and allowing the foam in those chambers to expand;*

*closing the second and third valves;*

*forcing air from the third chamber into the second chamber via the check valve;*

*opening the third valve and allowing the foam therein to expand; and*

*closing the third valve.*

* * * * *